Oct. 30, 1951 H. R. SHAW 2,573,284

OSCILLATOR

Filed Oct. 16, 1948

Inventor

Hubert R. Shaw

By

[signature]

Attorney

Patented Oct. 30, 1951 2,573,284

UNITED STATES PATENT OFFICE 2,573,284

OSCILLATOR

Hubert R. Shaw, Drexel Hill, Pa., assignor to Radio Corporation of America, a corporation of Delaware Application October 16, 1948, Serial No. 54,936

6 Claims. (Cl. 250—36)

This invention relates to electrical oscillators and more particularly to frequency stabilization of blocking oscillators and the like.

The present invention is particularly useful in television systems employing a cathode ray tube or other equivalent electron device in either or both the transmitting and receiving stations.

Television receiving systems in general comprise a cathode ray tube with horizontal and vertical ray-deflecting coils, a horizontal deflection system for causing a saw-tooth current wave at the desired line-scanning frequency to pass through the horizontal ray-deflecting coils, and a vertical deflection system for causing a saw-tooth current wave at the desired framing frequency to pass through the vertical ray-deflecting coils.

For the purpose of synchronizing the deflection of the cathode ray beam at the receiver with the deflection of the cathode ray beam at the transmitter an oscillator is locked in step with the scanning action at the transmitting station by transmitted synchronizing impulses.

While such an arrangement has been found to lend itself to satisfactory operation, a distinct operating disadvantage thereof resides in the fact that the fundamental frequency of oscillation of many oscillators are influenced by the applied plate and screen-grid voltage and tube characteristics. Relatively small variations in supply voltage therefore are effective to change the frequency sufficiently to sometimes throw the system out of synchronism.

In order to minimize the effect of variations in supply voltages there have been proposed various improved oscillator circuits. One such improved oscillator circuit known as the "blocking oscillator" has become quite popular. This improved oscillator circuit is well known and described in detail in the U. S. Reissue Patent 20,338, dated April 20, 1937, to William A. Tolson, the original patent of which is No. 1,999,378, dated April 30, 1935.

In accordance with the aforementioned invention of William A. Tolson, a system employing a blocking oscillator is used to control the horizontal deflection of the cathode ray beam of a television image producing tube.

Although the frequency of oscillations of blocking oscillators is generally dependent upon circuit element values, changes in tube characteristics and changes in operating potentials are effective to alter the oscillator frequency.

According to this invention, circuit arrangements are provided to minimize the effects of changes in tube characteristics and changes in operating potentials on the free running oscillator frequency. The grid capacitor normally associated with a blocking oscillator is caused to discharge at a rate which is automatically adjusted so that the free running speed is independent of normal tube variations, and power supply variations.

A primary object of this invention is to provide an improved electrical oscillator circuit.

Another object of this invention is to improve the stability of an oscillator.

Another object of this invention is to reduce the effect of changes in tube characteristics and operating potential on the frequency of an oscillator.

Other and incidental objects of the invention will be apparent to those skilled in the art from a reading of the following specification and an inspection of the accompanying drawing in which.

Figure 3:
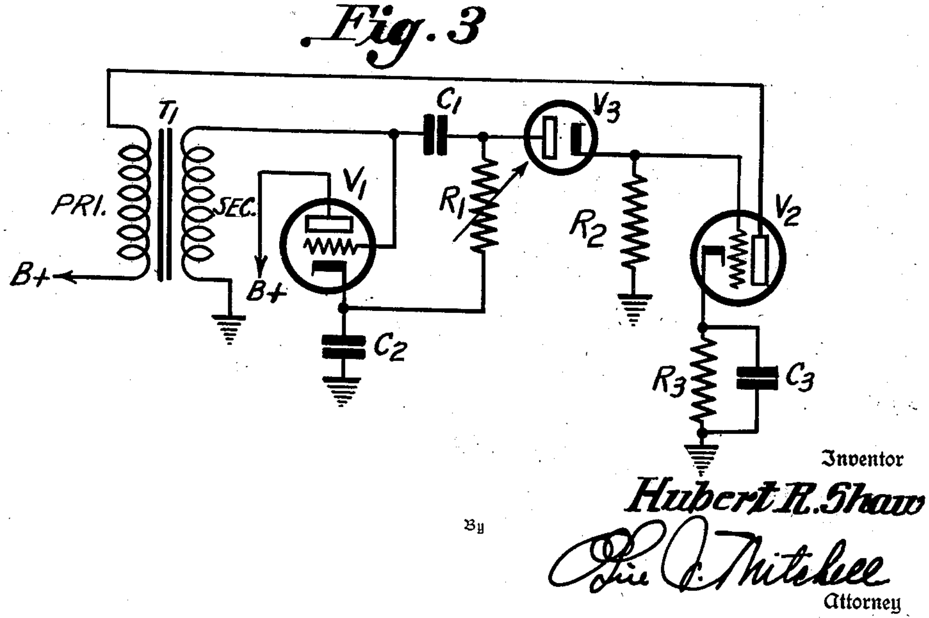

Figure 3 also shows by circuit diagram this invention in still another of its forms.

The blocking oscillator modified in accordance with the present invention consists essentially of a transformer-coupled oscillator with a capacity $C_1$ in series with the grid of triode $V_2$. For the purpose of explanation of the operation of the circuit shown it will be assumed that the grid capacitor $C_1$ has been negatively charged by a preceding cycle. The tube $V_2$ therefore is biased well below cut-off. As the charge on the capacitor $C_1$ leaks off, the negative biasing voltage is reduced to a point where the tube $V_2$ begins to conduct. As the plate current starts to flow in tube $V_2$, a magnetic field is set up around the primary of the transformer $T_1$.

If, for example, a current flows through the primary winding of the transformer $T_1$ so that the lower end of the primary winding of transformer $T_1$ is positive, the field set up in the core induces a voltage in the secondary winding, making the upper end of the secondary winding positive. The transformer $T_1$ associated with a blocking oscillator must be considered as a tuned circuit because of the stray and distributed capacitance across the transformer windings. Since plate current starts to flow through the primary of transformer $T_1$, a positive voltage is set-up across the secondary of the transformer and this voltage causes grid current to flow, charging the grid capacitor $C_1$. During this part of the cycle, the grid capacitor is essentially across the secondary of the transformer $T_1$, since the grid-cathode path is closed and the voltage across the secondary of the transformer can rise only as fast as the grid capacitor charges except for a relatively small voltage drop across the grid cathode path. The plate current of tube $V_2$ never reaches "saturation" in the generally accepted sense of the term. The plate current maximum is established by the grid and the plate potentials and is considerably short of saturation. After the secondary voltage has reached a maximum and the grid capacitor $C_1$ has been fully charged, both grid and plate current cease flowing but the voltage across the secondary of the transformer does not drop instantly to zero because of the charge in the capacitive branch of the circuit which is the stray and distributed capacitance of transformer $T_1$ and not the grid capacitance $C_1$.

During the second quarter cycle, the secondary voltage drops sinusoidally towards zero as the energy in the capacitive branch flows back into the inductive branch; that is, the transformer secondary. This fall of secondary voltage to zero causes the grid voltage to go negative beyond cut-off. During this second quarter cycle the charge on capacitor $C_1$ remains substantially constant. During the third quarter cycle, the energy in the transformer flows back again into the capacitive branch and the voltage across the secondary becomes negative. This causes the grid of the tube to become still more negative since the voltage across the secondary and the voltage across the grid capacitor are additive. During the fourth quarter cycle, there is another exchange of energy between the capacitive and inductive branches and the secondary voltage again falls to zero. There is considerable loss in the circuit so that by the end of the first cycle, very little energy is left in the circuit and the "ringing" action ceases. From this time on, the secondary voltage remains substantially at zero and the tube is left with a large negative voltage on its grid due to the charge on the grid capacitor. The charge on the grid capacitor $C_1$ is then dissipated by the grid leak $R_1$. The time required for the charge to leak-off the grid capacitor $C_1$, determines the repetition rate.

So far as we have gone in the explanation of the operation of the circuit it will be seen that variations in tube characteristics and operating potentials will cause condenser $C_1$ to be charged to different amounts and also cause tube $V_2$ to start conducting at a different time and conduct at a different rate.

Figure 1:
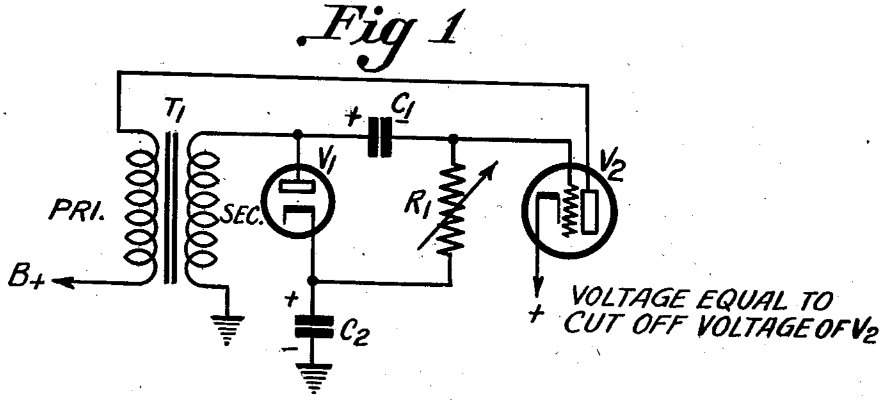
Figure 1 shows by circuit diagram this invention in one of its simplest forms.

In accordance with this invention, as illustrated in Figure 1 for example, there is included a diode $V_1$ and a capacitor $C_2$. The value of capacitor $C_2$ is relatively large with respect to the value of capacitor $C_1$.

In Figure 1, $T_1$, $C_1$, and $V_2$ are connected as in a conventional blocking oscillator circuit. When the oscillator fires, a positive voltage is produced across $T_1$ secondary and both $C_1$ and $C_2$ charge to approximately the value of this voltage with the polarity shown.

$C_2$ is many times larger than $C_1$ and holds this value of voltage from cycle to cycle while $C_1$ discharges through $R_1$ during each cycle until the voltage on the grid or control electrode of $V_2$ reaches ground potential or until the voltage across $C_1$ is zero when another cycle of oscillation begins. The period of time required for this action to take place is determined by the value of $C_1$ and $R_1$.

It should be noted that if $V_2$ were momentarily removed from the circuit, $C_1$ would discharge to zero and charge in the reverse direction to a value equal to the voltage across $C_2$. In the normally operating circuit, therefore, $V_2$ fires when the voltage across $C_1$ has changed exactly one-half of the amount that it would change if the discharge and charge action were permitted to continue to completion.

Any normal variation in $V_2$ or in the power supply voltage is automatically compensated for in the following manner. Suppose that the $G_m$ of $V_2$ decreases or that the power supply voltage decreases. In this case, the magnitude of the voltage developed across $T_1$ secondary is reduced, which reduced the voltage produced across both $C_1$ and $C_2$. However, since the values of $C_1$ and $R_1$ are unchanged, it will take exactly the same period of time for $C_1$ to discharge to zero as it did in the previous case. Thus, the free-running speed of the oscillator is independent of the variables which normally cause a variation in the free-running speed.

Synchronizing signals may be injected into the circuit in the usual manner and since the free-running speed is constant, the oscillator may be depended upon to stay in sync with synchronizing signals of much lower amplitude.

Noise pulses normally accompanying the sync signals, therefore, have much less tendency to trip the oscillator ahead of the sync signal.

Figure 2:
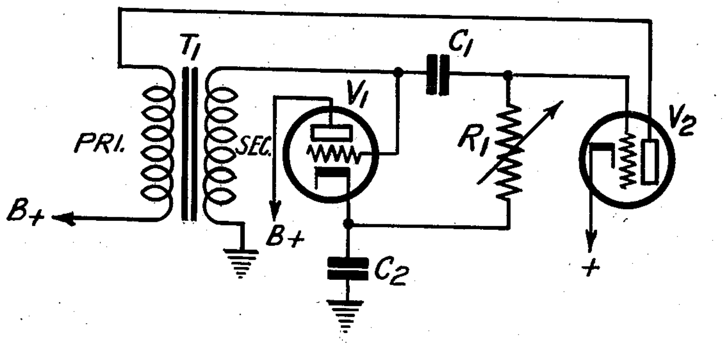
Figure 2 shows by circuit diagram this invention in another of its forms.

In another form of the invention, a cathode follower $V_1$ in Figure 2 is substituted for the diode $V_1$ in Figure 1. The voltage produced across $C_2$ is again equal to the peak voltage across transformer $T_1$ secondary, but the energy to keep $C_2$ charged now comes directly from the B+ supply rather than from transformer $T_1$ as in Figure 1.

In still another form of this invention shown in Figure 3, there is added a diode $V_3$ in series with the coupling circuit. $V_2$ is now cathode-biased by means of $R_3$—$C_3$ to permit a small amount of plate current to flow in $V_2$ during the period between oscillations when the plate current is normally cut off. Oscillation cannot take place until the voltage across $C_1$ decreases to zero, at which time the voltage on the plate or anode of $V_3$ is at ground potential, and any further change in $C_1$ voltage causes $V_3$ to conduct placing a positive voltage on the grid of $V_2$ and starting the oscillation cycle. This arrangement causes the free-running frequency of the oscillator to be independent also of variations in the cut-off voltage of various tubes placed in $V_2$ position.

Having thus described the invention, what is claimed is.

1. A blocking oscillator comprising in combination an electron discharge device having a cathode, an anode and a control electrode, a transformer having a primary and a secondary, a condenser connected between said transformer secondary and said control electrode, the transformer primary connected between said anode and a first point of fixed potential, the secondary of said transformer also connected to a unidirectional current device, a capacitive element connected between a second point of fixed potential and the opposite terminal of said unidirectional current device to which said transformer secondary is connected, the capacity of said capacitance element being large with respect to the capacity of said condenser, a resistance element connected between said control electrode and the junction between said capacitive element and said unidirectional current device.

2. A blocking oscillator comprising in combination an electron discharge device having an input and output circuit, an electrical coupling between said input and output circuits, a condenser connecting said coupling to said electron discharge device input circuit, the output of said coupling circuit having connected in parallel therewith a serially connected diode and a capacitive element, the input circuit of said electron discharge device having connected in parallel therewith a serially connected resistance and said capacitive element.

3. A blocking oscillator comprising in combination an electron discharge device having an input and output circuit, an electrical coupling between said input and output circuits, a condenser connecting said coupling to said electron discharge device input circuit, a diode having an anode and a cathode, the output of said coupling circuit shunted by said serially connected diode and capacitive element, and wherein the anode of said diode is connected to the terminal of said condenser opposite to the terminal of said condenser which is connected to said input circuit, said input circuit also shunted with a resistance and said capacitive element connected serially.

4. An oscillator comprising in combination a tube having an input and output circuit, an electrical coupling between said input and output circuits polarized to produce oscillation of said tube, said coupling including a transformer having a primary and a secondary, a condenser connected serially between said transformer secondary and said input circuit, said transformer secondary having connected in parallel therewith a series circuit of a unidirectional current device and a capacitive element, the capacity of said capacitance element being large with respect to the capacity of said condenser, said input circuit having connected in parallel therewith a series circuit including a resistance and said capacitive element.

5. An oscillator comprising in combination a tube having an anode and control electrode, an electrical coupling between said control electrode and anode polarized to produce oscillation of said tube, said coupling including a transformer having a primary and a secondary, a condenser connected serially between said transformer secondary and said control electrode, said transformer secondary having connected in parallel therewith a series circuit of a unidirectional current device and a capacitive element, the capacity of said capacitance element being large with respect to the capacity of said condenser, said control electrode having connected in parallel therewith a series circuit including a resistance and said capacitive element.

6. An oscillator comprising in combination an electron discharge device having an input and output circuit, an electrical coupling between said input and output circuits, a condenser connecting said electrical coupling with said input circuit, said condenser having connected in parallel therewith a unidirectional current flow device connected in series with a resistance element, a capacitive element connected between a point of fixed potential and the junction between said unidirectional current flow device and said resistance element.

HUBERT R. SHAW.

REFERENCES CITED

The following references are of record in the file of this patent:

UNITED STATES PATENTS

| Number | Name | Date |
|---|---|---|
| Re. 20,338 | Tolson | Apr. 20, 1937 |
| 2,165,815 | Rhea | July 11, 1939 |
| 2,221,069 | Andrieu | Nov. 12, 1940 |
| 2,227,075 | Geiger | Dec. 31, 1940 |
| 2,438,845 | Dodds et al. | Mar. 30, 1948 |
| 2,448,069 | Ames, Jr., et al. | Aug. 31, 1948 |